(12) United States Patent
Eun (10) Patent No.: US 10,044,599 B2
(45) Date of Patent: Aug. 7, 2018

(54) METHOD FOR MANAGING DOMAIN ROUTING TABLE IN ROUTER ON NETWORK STRUCTURE BASED ON HIERARCHICAL DOMAIN

(71) Applicant: Electronics and Telecommunications Research Institute, Daejeon (KR)

(72) Inventor: Jee Sook Eun, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 233 days.

(21) Appl. No.: 14/997,009

(22) Filed: Jan. 15, 2016

(65) Prior Publication Data

US 2016/0218959 A1    Jul. 28, 2016

(30) Foreign Application Priority Data

Jan. 27, 2015    (KR) .................... 10-2015-0012950

(51) Int. Cl.
*H04L 12/715*    (2013.01)
*H04L 12/751*    (2013.01)

(52) U.S. Cl.
CPC .............. *H04L 45/04* (2013.01); *H04L 45/02* (2013.01)

(58) Field of Classification Search
None
See application file for complete search history.

(56) References Cited

U.S. PATENT DOCUMENTS

| 7,330,469 | B2 | 2/2008 | Ko et al. |
| 2005/0169264 | A1 | 8/2005 | Kim et al. |

| 2008/0259923 | A1* | 10/2008 | Bryant | H04L 45/02 370/392 |
| 2009/0279536 | A1* | 11/2009 | Unbehagen | H04L 12/462 370/352 |
| 2010/0054157 | A1* | 3/2010 | Farkas | H04L 12/462 370/256 |

(Continued)

FOREIGN PATENT DOCUMENTS

| KR | 100271856 B1 | 11/2000 |
| KR | 100534617 B1 | 12/2005 |

OTHER PUBLICATIONS

P. Murphy, "The OSPF Not-So-Stubby Area (NSSA) Option," IETF, RFC 3101, Jan. 2003, pp. 1-33.

(Continued)

*Primary Examiner* — Azizul Q Choudhury
(74) *Attorney, Agent, or Firm* — William Park & Associates Ltd.

(57) ABSTRACT

The present disclosure relates to a method for hierarchically managing routing information in a domain router for routing domains on a network. The method includes: storing and managing a domain state advertisement message received from a neighboring domain router in a storage unit in a certain database format, generating at least one management target domain area according to the domain state advertisement message, and generating management information including a spanning tree including routing topology information and a routing table for each of the management target domain area to maintain in the storage unit; and reconfiguring the spanning tree according to a change of the database or a given cycle and updating the routing table to store and manage in the storage unit.

16 Claims, 8 Drawing Sheets

(56) References Cited

U.S. PATENT DOCUMENTS

2012/0155471 A1    6/2012  Lee et al.
2016/0007273 A1*  1/2016  Farid .................... H04W 48/16
                                                              370/329

OTHER PUBLICATIONS

J. Moy, "OSPF Version 2," IETF, RFC 2328, Apr. 1998, pp. 1-244.
J. Moy et al.,"Graceful OSPF Restart," IETF, RFC 3623, Nov. 2003, pp. 1-18.

* cited by examiner

[CONFIGURATION INFORMATION OF DOMAIN STATE ADVERTISEMENT MESSAGE]

(1) DOMAIN IDENTIFIER - WHICH IS DOMAIN NAME CONFIGURED IN FORM OF CONNECTION TO OWN LAYER FROM UPPERMOST LAYER (2) LAYER INFORMATION - WHICH IS OWN LAYER INFORMATION CONFIGURED IN FORM OF INCREASING FROM UPPER TO LOWER (3) DOMAIN FORMAT - WHICH IS TRANSMISSION FORMAT OF DOMAIN AND INDICATES WHETHER ROUTING IS POSSIBLE THROUGH THIS DOMAIN. IT IS USED TO OBTAIN INFORMATION ON DIRECTIVITY OF GRAPH GENERATED WHEN CONFIGURING DOMAIN TOPOLOGY. WHEN ROUTING IS POSSIBLE, LINE CONNECTED TO THIS DOMAIN BECOMES BIDIRECTIONAL LINE, AND WHEN ROUTING IS NOT POSSIBLE, LINE CONNECTED TO THIS DOMAIN BECOMES UNIDIRECTIONAL LINE.

(4) OUTLET INFORMATION - WHICH INDICATES WHETHER TO MOVE TO UPPER LAYER THROUGH THIS DOMAIN (5) METRIC - DOMAIN TRANSMISSION COST (6) NUMBER OF NEIGHBOR - NUMBER OF NEIGHBOR CONNECTED TO THIS DOMAIN (7) NEIGHBOR LIST - INFORMATION OF NEIGHBORS CONNECTED TO THIS DOMAIN
[CONFIGURATION INFORMATION OF NEIGHBOR LIST]
- DOMAIN IDENTIFIER - WHICH IS DOMAIN NAME CONFIGURED IN FORM OF CONNECTION TO OWN LAYER FROM UPPERMOST LAYER. HOWEVER, WHEN INFORMATION OF OUTLET INDICATOR IS VALID, IT INCLUDES INFORMATION ON OUTLET. FOR EXAMPLE, WHEN CONTAINING OUTLET INFORMATION IN NEIGHBOR LIST OF C:B:26, AS IT IS POSSIBLE TO MOVE TO C:C THROUGH C:B:26, C:C IS ADDED TO NEIGHBOR LIST, AND IN CASE OF C:B:30, IT IS POSSIBLE TO MOVE TO A THROUGH C:B:30, A IS ADDED TO NEIGHBOR LIST. WHEN INFORMATION OF OUTLET INDICATOR IS INVALID, IT ADDS NEIGHBORS WHICH IS DIRECTLY CONNECTED AMONG DOMAINS HAVING THE SAME PARENT OF SAME LAYER, AND HAS B:B:5 AND B:B:6 AS NEIGHBOR LIST IN CASE OF B:B:4,
- LAYER INFORMATION - SAME AS (2)
- DOMAIN FORMAT - SAME AS (3)
- OUTLET INDICATOR - MARKER WHEN IT CAN BE USED AS OUTLET DOMAIN
- DELETION INDICATOR - MARKER WHEN CORRESPONDING
                            DOMAIN IS DISAPPEARED

FIG. 6

[INTERFACE INFORMATION MANAGED IN EACH DOMAIN ROUTER]

(1) INTERFACE: LAYER NUMBER - LAYER NUMBER OF DOMAIN SET IN DOMAIN
    SHARED BETWEEN ADJACENT DOMAIN ROUTERS AND INDEX OF
    INTERFACE INFORMATION FOR SHARED LINK (2) INTERFACE - INTERFACE INFORMATION FOR LINK SHARED
    BETWEEN ADJACENT DOMAIN ROUTERS (3) LAYER NUMBER - LAYER NUMBER OF DOMAIN SHARED
    BETWEEN ADJACENT DOMAIN ROUTERS (4) DOMAIN NAME - NAME OF DOMAIN SHARED
    BETWEEN ADJACENT DOMAIN ROUTERS (5) DOMAIN FORMAT - TRANSMISSION FORMAT OF DOMAIN SHARED
    BETWEEN ADJACENT DOMAIN ROUTERS (6) PROTOCOL INFORMATION - COMMUNICATION PROTOCOL INFORMATION OF
    DOMAIN SHARED BETWEEN ADJACENT DOMAIN ROUTERS. FOR EXAMPLE,
    INFORMATION INDICATING WHETHER IP PROTOCOL IS USED,
    OR MAC PROTOCOL IS USED.

(7) MAC ADDRESS - MAC ADDRESS OF ADJACENT DOMAIN ROUTER (8) IP ADDRESS - IP ADDRESS OF ADJACENT DOMAIN ROUTER. WHEN ADJACENT
    DOMAIN ROUTER SUPPORTS ONLY MAC PROTOCOL, THIS VALUE DOES NOT EXIST.

(9) METRIC VALUE - LINK COST FOR TRANSMITTING TO ADJACENT DOMAIN ROUTER (10) INTERFACE: LAYER: INDEX LIST - DOMAIN CONFIGURATION
     INFORMATION LIST OF INTERFACE WHICH ADJACENT DOMAIN ROUTER HAS
        [CONFIGURATION INFORMATION OF INTERFACE: LAYER: INDEX LIST]
          · INTERFACE: LAYER INFORMATION
          · DOMAIN FORMAT
          · LAYER NUMBER
          · DOMAIN NAME

FIG.7

[INTERFACE INFORMATION MANAGED IN DOMAIN ROUTER R3]

✓ INTERFACE: LAYER NUMBER - eth1:2
    ✓ INTERFACE - eth1
    ✓ LAYER NUMBER - 2
    ✓ DOMAIN NAME - Q:Q1:1
    ✓ DOMAIN FORMAT - TRANSMITTABLE
    ✓ PROTOCOL INFORMATION - IP PROTOCOL
    ✓ MAC ADDRESS - MAC ADDRESS ASSIGNED TO eth0 OF DOMAIN ROUTER R1
    ✓ IP ADDRESS - IP ADDRESS ASSIGNED TO eth0 OF DOMAIN ROUTER R1
    ✓ METRIC VALUE - LINK COST ASSIGNED TO eth1 OF DOMAIN ROUTER R3
    ✓ INTERFACE: LAYER: INDEX LIST
      [CONFIGURATION INFORMATION OF INTERFACE: LAYER: INDEX LIST]
       · INTERFACE: LAYER NUMBER - eth0:2
       · DOMAIN FORMAT - TRANSMITTABLE
       · LAYER NUMBER - 2
       · DOMAIN NAME - Q:Q1:1
       · INTERFACE: LAYER NUMBER - eth1:1
       · DOMAIN FORMAT - TRANSMITTABLE
       · LAYER NUMBER - 1
       · DOMAIN NAME - Q:Q2

FIG.8

METHOD FOR MANAGING DOMAIN ROUTING TABLE IN ROUTER ON NETWORK STRUCTURE BASED ON HIERARCHICAL DOMAIN

CROSS-REFERENCE TO RELATED APPLICATION

This application claims the benefit of priority to Korean Patent Application No. 10-2015-0012950, filed on Jan. 27, 2015 in the Korean Intellectual Property Office, the disclosure of which is incorporated herein in its entirety by reference.

BACKGROUND OF THE INVENTION

Field of the Invention

The present disclosure relates to a method for managing a domain routing table in a router, and more particularly, to a method of reconfiguring domains on a network into a hierarchical domain and generating a domain routing tables required for a router to find a communication path with respect to a communication between domains, thereby effectively managing routing information based on a hierarchical domain.

Description of the Related Art

Recently, Internet uses communication between two layers separated by an inter-network and an intra-network. A router operated in the intra-network maintains a routing table which records a routing path of an entire intra-network, and a router operated in the inter-network maintains a routing table which records a routing path of an entire inter-network while recording path of partial intra-network, such that the size of the routing table is increased exponentially. In addition, since a change in a partial configuration of an entire network affects the entire network, a spread delay time for applying the recognition for an amount and a change of a control message generated in every change of a network state to a router of the entire network grows longer.

In order to solve the structural problem of current Internet, a domain network that divides the entire network into a domain unit and applies a hierarchical structure between domains has been proposed as an alternative, and a domain routing table used in the domain network has been already proposed. However, an efficient technology for actually configuring the domain routing table does not exist. Since an open shortest path first (OSPF) routing protocol, which is mainly used in the intra-network of the current Internet, is not appropriate to be used in a plurality of hierarchical domain structures, a routing protocol that can be used in a hierarchical domain network is required.

SUMMARY OF THE INVENTION

The present disclosure has been made in view of the above problems, and provides a method for generating a domain routing table by a domain router on a network and efficiently managing routing information based on a hierarchical domain so that domains in the network may be reconfigured in a hierarchical domain structure, the size of the domain routing table necessary to find a communication path for a communication between domains may be reduced, and a spread delay time may be significantly reduced by limiting a change in the network by a domain unit.

In addition, to this end, the present disclosure further provides a method for managing hierarchically a destination domain list by each domain router, generating and managing next hop information, information of interface with an adjacent router, and the like for moving to a destination domain in a routing table, finding a domain corresponding to a next hop from among a current domain based on the routing table, and finding information of interface to a neighboring domain router for moving to corresponding next hop.

In accordance with an aspect of the present disclosure, a method for hierarchically managing routing information in a domain router for routing domains on a network includes: storing and managing a domain state advertisement message received from a neighboring domain router in a storage unit in a certain database format, generating at least one management target domain area according to the domain state advertisement message, and generating management information including a spanning tree including routing topology information and a routing table for each of the management target domain area to maintain in the storage unit; and reconfiguring the spanning tree according to a change of the database or a given cycle and updating the routing table to store and manage in the storage unit.

A corresponding router which is a domain router of the same layer or an upper layer having the same parent as the neighboring domain router receives the domain state advertisement message transmitted by the neighboring domain router.

The routing topology information includes topology information between domains which have the same layer as its own layer and have the same parent domain information, and topology information on at least one upper domain having domain information identical with parent domain information.

The routing table manages a list for information on connection between layers with respect to destination domains belonging to the same layer as a destination domain list of a source domain and destination domains of its upper layer.

The routing table further manages next hop information for routing to the destination domains and outlet information of the domain router for routing to the upper layer.

The routing table manages interface information on at least one adjacent domain router as the outlet information.

The interface information includes information on an interface index for a domain shared with the adjacent domain router, a layer number of a corresponding share domain, a name, domain format, protocol information of a corresponding share domain, a MAC address, IP address of the adjacent router, a transmission metric to the adjacent router, and a domain configuration information list of each interface which the adjacent domain router has.

The domain state advertisement message includes a domain identifier, layer information, a domain format, outlet information, metric, a number of adjacent domain, and a neighboring domain list, and the neighboring domain list includes a domain identifier, layer information, a domain format, an outlet indicator, and a deletion indicator.

In accordance with another aspect of the present disclosure, a domain router for hierarchically managing routing information for routing domains on a network includes: a storage unit; and a management unit configured to store and manage a domain state advertisement message received from a neighboring domain router in the storage unit in a certain database format, generate at least one management target domain area according to the domain state advertisement message, and generate management information including a spanning tree including routing topology information and a routing table for each of the management target domain area to maintain in the storage unit, wherein the management unit reconfigures the spanning tree according to a change of the database or a given cycle and updates the routing table to store and manage in the storage unit.

The management unit of a corresponding router which is a domain router of the same layer or an upper layer having the same parent as the neighboring domain router receives the domain state advertisement message transmitted by the neighboring domain router.

The routing topology information includes topology information between domains which have the same layer as its own layer and have the same parent domain information, and topology information on at least one upper domain having domain information identical with parent domain information.

The routing table manages a list for information on connection between layers with respect to destination domains belonging to the same layer as a destination domain list of a source domain and destination domains of its upper layer.

The routing table further manages next hop information for routing to the destination domains and outlet information of the domain router for routing to the upper layer.

The routing table manages interface information on at least one adjacent domain router as the outlet information.

The interface information includes information on an interface index for a domain shared with the adjacent domain router, a layer number of a corresponding share domain, a name, domain format, protocol information of a corresponding share domain, a MAC address, IP address of the adjacent router, a transmission metric to the adjacent router, and a domain configuration information list of each interface which the adjacent domain router has.

The domain state advertisement message includes a domain identifier, layer information, a domain format, outlet information, metric, a number of adjacent domain, and a neighboring domain list, and the neighboring domain list includes a domain identifier, layer information, a domain format, an outlet indicator, and a deletion indicator.

According to a method for generating and managing a domain routing table in a router, the domain router according to the present disclosure may generate a necessary routing table by reconfiguring a hierarchical domain-based network structure in order to take advantage of a hierarchical domain structure so that it is possible to solve the problem that the routing table size is increased exponentially according to the increase of the number of the domain router, and it is possible to shorten the number of a control message such as the DSA or the message delay spread time.

In addition, each domain router may manage the destination domain list hierarchically, and generate and manage the next hop information, information of interface with adjacent router, and the like for moving to a destination domain in the routing table, and thus may search a domain corresponding to the next hop from among a current domain based on the routing table and search information of interface to a neighboring domain router for moving to a corresponding next hop, thereby accomplishing a routing efficiently.

BRIEF DESCRIPTION OF THE DRAWINGS

The objects, features and advantages of the present disclosure will be more apparent from the following detailed description in conjunction with the accompanying drawings, in which:

FIG. 5 is a diagram illustrating information included in a DSA message transmitted to a neighboring domain router from a domain router according to an embodiment of the present disclosure;

DETAILED DESCRIPTION OF EXEMPLARY EMBODIMENTS

Exemplary embodiments of the present disclosure are described with reference to the accompanying drawings in detail. The same reference numbers are used throughout the drawings to refer to the same or like parts. Detailed descriptions of well-known functions and structures incorporated herein may be omitted to avoid obscuring the subject matter of the present disclosure.

Figure 1:
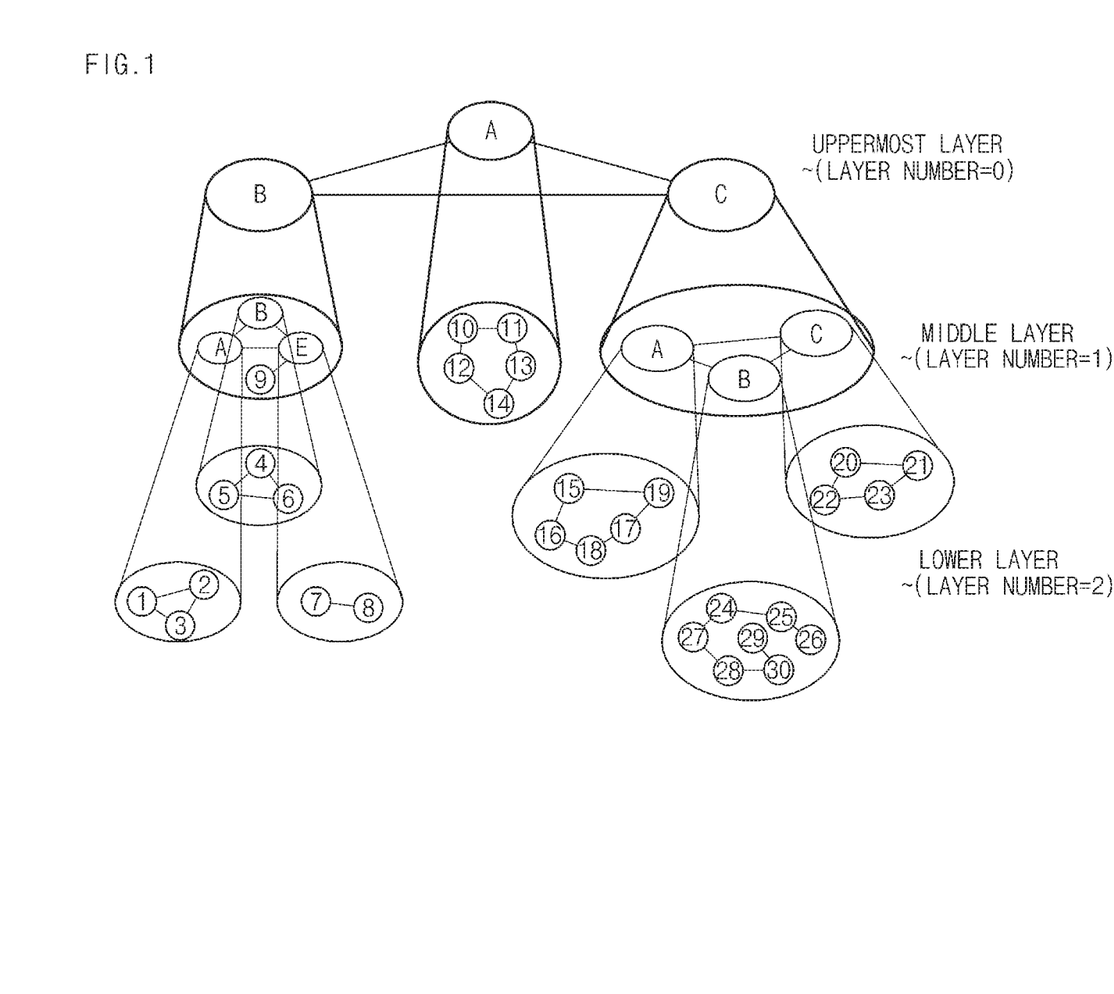
FIG. 1 is a diagram illustrating a hierarchical domain management structure of a tree type for domains on a network managed in a domain routing table in a domain router according to an embodiment of the present disclosure.
Figure 2:
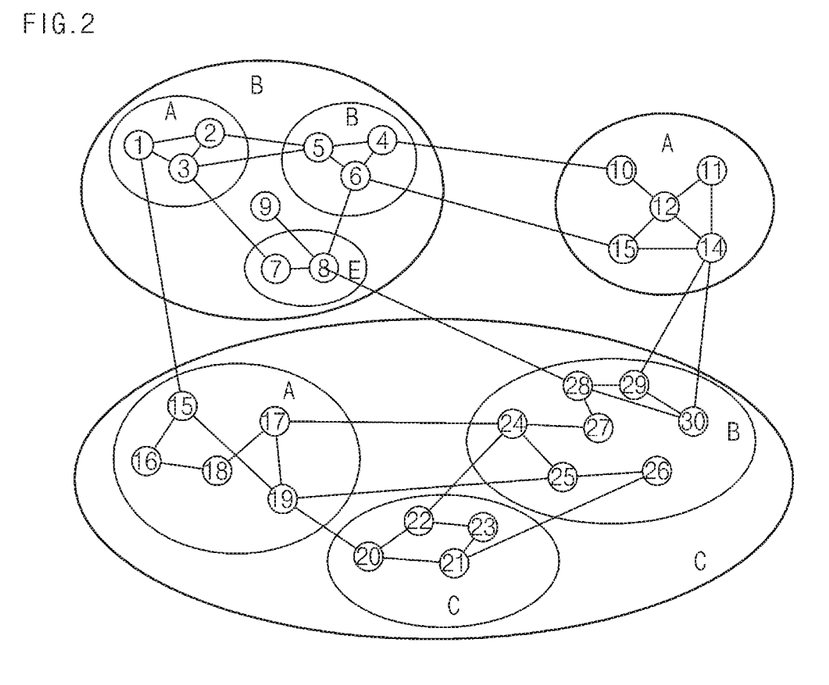
FIG. 2 is a diagram illustrating a structure of a hierarchical domain network of a tree type of FIG. 1 in a plane form.

FIG. 1 is a diagram illustrating a hierarchical domain (or a domain server) management structure of a tree type for domains on a network managed in a domain routing table in a domain router according to an embodiment of the present disclosure, and FIG. 2 is a diagram illustrating a structure of a hierarchical domain network of a tree type of FIG. 1 in a plane form. In FIG. 1, and FIG. 2, one domain is indicated as a circle.

Referring to FIG. 1 and FIG. 2, a top layer may include domains A, B, C, and a middle layer may include domains 10 to 14 included in the domain A of the top layer, domains 9, A, B, E included in the domain A of the top layer, and domains A, B, C included in the domain C of the top layer. In addition, lower layer domains are included in each domain in the middle layer. Here, a hierarchical domain management structure having a three-layer including the top layer, the middle layer, and the lower layer is illustrated, but it is not limited thereto, and may be implemented by a more-layer structure. In addition, domains of more top layers or lower layers which are configured of parent-child node relationship may be added according to a domain change, and a removed domain may occur.

As described below, the layer number of the domains in the top layer is "0", and the layer number is gradually increased as it goes toward down. The layer number of the domains in the middle layer is '1', and the layer number of the domains in the lower layer is "2".

The name of the domain may be configured of a form of connection between the layers from the top layer. Table 1 indicates an example of a destination domain list of a routing table for a managed sub-domain "1" in order to find a routing path in a domain router in the network. As shown in Table 1, the name of the sub-domain "1" which is a source domain is "B:A:1', and entire destination domains for the sub-domain "1" may include B:A:2, B:A:3 of the same layer, B:B, B:E, B:9 of the middle layer, and A, C of the top layer. Thus, the domain router may maintain a list of entire destination domains which are in connection with each other in each domain.

TABLE 1

| Source domain | Destination domain |
| --- | --- |
| B:A:1 | B:A:2 |
|  | B:A:3 |
|  | B:B |
|  | B:E |
|  | B:9 |
|  | A |
|  | C |

In order to find a routing path by using a managed routing table, for example, in order to connect to a destination domain 'C:C:21' from a certain domain, it is necessary to refer to a path for moving to 'C' domain in the top layer domain. Since downward destination domain information of 'C' domain in the top layer domain may be obtained by referring to the destination domain list of the routing table for 'C' domain, it is possible to perform a routing by using only the destination domain list indicating a connection form between the layers that are managed in the routing table as above.

A destination domain list configured in the routing table of the lower layer domain '30' in FIG. 1 and FIG. 2 is shown in Table 2.

TABLE 2

| Source domain | Destination domain |
| --- | --- |
| C:B:30 | C:B:24 |
|  | C:B:25 |
|  | C:B:26 |
|  | C:B:27 |
|  | C:B:28 |
|  | C:B:29 |
|  | C:A |
|  | C:C |
|  | A |
|  | B |

As described above, in the present disclosure, as a destination domain list of the source domain, the domain router may record and manage connection information between the layers with respect to the destination domains belonging to the same layer and the destination domains of the upper layer, such that its size is significantly reduced.

Meanwhile, the domain router may further manage next hop information (including IP address) for routing to the destination domain and outlet information (including IP address) of domain router for routing to upper layer in the domain routing table. For example, in FIG. 1 and FIG. 2, next hop information for routing a lower layer domain 27 (C:B:27) to a lower layer domain 30 (C:B:30) may be a lower layer domain 28 (C:B:28).

The domain router (refer to R1, R2, R3 of FIG. 3) may transmit a domain state advertisement (DSA) message including information, as shown in FIG. 5, such as a domain identifier, layer information, a domain format, outlet information, metric, the number of neighbor (domain), neighbor (domain) list (the domain identifier, the layer information, the domain format, an outlet indicator, a deletion indicator, or the like) to the domain router of the same layer having the same parent and just above upper layer, configure a routing topology based on information of connection between domains to manage the transmitted message together with a corresponding routing table such that the connection between domains are shared. Therefore, the next-hop information (including IP address), the outlet domain information (including IP address) of the domain router, or the like may be available.

The information configuring the routing topology may include topology information between domains which have the same layer as its own layer and have the same parent domain information, and topology information on at least one upper domain having domain information identical with parent domain information.

In the above example, the fact that the next hop information for routing a lower layer domain 27 (C:B:27) to a lower layer domain 30 (C:B:30) may be a lower layer domain 28 (C:B:28) may be achieved, when the next hop information or the like is shared between domains 24 to 30 belonging to the lower layer of the middle layer domain B (C:B) according to the routing topology configured by the domain router.

As another example of the next hop information, if it is desired to move to the middle layer 10 (A:10) domain from the lower layer 23 (C:C:23) domain, the lower layer 23 (C:C:23) domain should move to the uppermost layer A domain after escaping from the middle layer C (C:C) and then escaping from the uppermost layer C domain. When a domain desires to move to the upper layer domain, it is necessary to recognize information on a certain domain that can exit the current domain to which the domain belongs, and a path search for moving to the certain domain should be accomplished. That is, in order to be routed to the middle layer 10 (A:10) domain from the lower layer 23 (C:C:23) domain, a path for moving to the upper most layer domain A from the middle layer domain C (C:C) to which it belongs should be recognized through the routing topology information of the middle layer domain A, B, C, and a certain domain should be recognized from among the lower middle layer domain C:A, C:B, C:C of uppermost layer domain C in order to move to the uppermost layer domain A after escaping from the middle layer domain C.

Since it can be recognized with reference to routing topology information configured of uppermost layer domain A, B, C that a moving from the middle layer domain C (C:C) to which it belongs to the upper most layer domain A should be accomplished, and it can be recognized that C:A and C:B domains among C:A, C:B, C:C may be used in order to escape from the middle layer domain C:C, C:A is an outlet domain for moving to the uppermost layer domain B, and C:B is an outlet domain for moving to the uppermost layer domains B and C, it can be recognized that a moving to C:B should be accomplished in order to move to the uppermost layer domain A.

Here, the lower layer 23 (C:C:23) domain have to search a path for moving to C:B, and may search the path with reference to routing topology information configured of C:A, C:B, C:C in order to move to C:B. When moving to C:B from C:C, it can be recognized that the moving to C:B can be directly accomplished. Thus, outlet domain information of C:C may be searched. Since the outlet domain information of C:C is C:C:20, C:C:21, C:C:22, and, among them, an outlet which enable to move to C:B is C:C:22 and C:C:21, the next hop of C:C:23 may select first the path having smaller metric value between C:C:22 and C:C:21.

From the configuration information of the DSA message as shown above, the domain router may configure a routing topology including topology information between domains having the same layer as its own layer and having the same parent domain information, and topology information on at least one upper domain having the same information as parent domain, and may be shared between domains together with a corresponding routing table. Therefore, the source domain may be routed to search next hop information and outlet domain information and connect to the destination domain.

A parent domain means a case in which domain information is matched for each layer. For example, in FIGS. 1 and 2, the parent domain of the lower layer domain 20 (C:C:20) is C of layer 0 and C:C of layer 1, the parent domain of the middle layer domain 30 (C:B:30) is C of layer 0 and C:B of layer 1, and the parents of layer 0 of C:C:20 and C:B:30 are identical. However, the parent domain of the lower layer domain 4 (B:B:4) is B of layer 0 and B:B of layer 1, the parent domain of the lower layer domain 24 (C:B:24) is C of layer 0 and C:B of layer 1. Thus, since B of layer 1 is identical but layer 0 is different, the parent domain is not the same.

Figure 3:
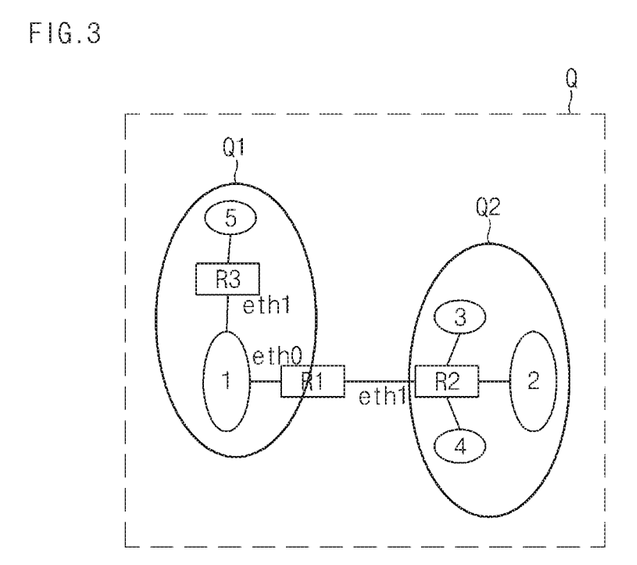
FIG. 3 is a diagram illustrating a position of a domain router and a method for generating and managing a routing table according to an embodiment of the present disclosure.

FIG. 3 is a diagram illustrating a position of a domain router and a method for generating a routing table according to an embodiment of the present disclosure.

Referring to the structure of a hierarchical domain network illustrated in FIG. 3, a lower portion of the uppermost layer domain Q of layer number 0 may include middle layer domains Q:Q1 and Q:Q2 of layer number 1, and the middle layer domain Q:Q1 may include domain routers R1 and R3 adjacent to lower layer domains Q:Q1:1 and Q:Q1:5 of layer number 2. The middle layer domain Q:Q2 may include lower layer domains Q:Q2:2, Q:Q2:3, Q:Q2:4 of layer number 2.

Figure 4:
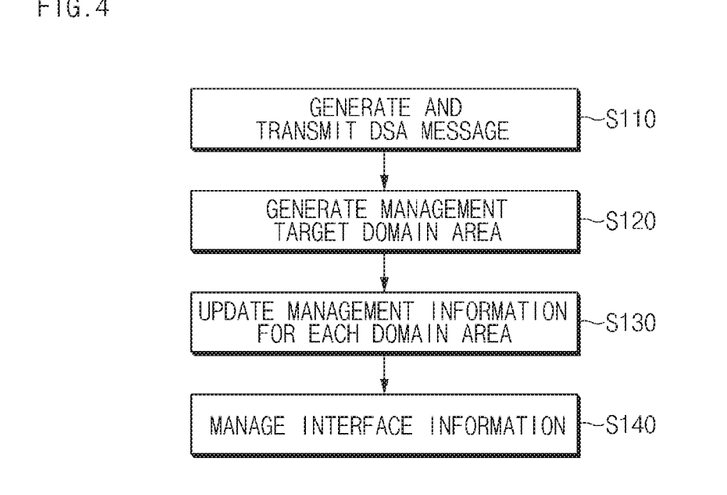
FIG. 4 is a flow chart illustrating the method for generating and managing a routing table of FIG. 3.

The domain routers (R1, R2, R3) may generate a DSA message as described above based on the domain information assigned to each interface and transmit to the domain router of the same layer having the same parent and just above upper layer (see S110 of FIG. 4). The domain routers (R1, R2, R3) may configure a routing topology based on connection information between domains according to the DSA message so that connection between domains may be shared by managing the routing topology together with the routing table. Such features and functions as described below of each domain router may be achieved in a given management part or a management means of each domain router, and this management part or management means may be made implemented by hardware (e.g., a semiconductor processor), software, or a combination thereof.

In FIG. 3, for example, the domain router R3 may be assigned domain Q:Q1:5 and Q:Q1:1, and, based on this information, may generate and transmit a DSA message, and may generate a management target domain area in order to configure a routing topology (see S120 of FIG. 4). According to the DSA message received from other neighbor domain router, the domain router R3 may configure the management target domain area into TOP={Q, . . . }, TOP:Q={Q:Q1, Q:Q2}, TOP:Q:Q1={Q:Q1:1, Q:Q1:5}, and store and manage a domain area name, domain, a domain area layer number, a domain area type, a domain area DSA database, a domain area spanning tree, a domain area routing table, and the like in storage means, according to each management target domain area. TOP may represent an uppermost layer management target domain area.

[Management Information for Each Domain Area in Domain Router R3]
 Domain area name
 Domain area layer number
 Domain area type
 Domain area DSA data base
 Domain area spanning tree
 Domain area routing table Each domain router may store and manage the DSA message collected from other domain router(s) in a DSA database of domain area without overlapping, and may reconfigure the spanning tree including routing topology information and update the routing table according to a change of the DSA database and a given cycle to store and manage in a storage means (see S130 in FIG. 4).

In addition, when the domain router (e.g., R3) records information on a destination domain list such as domain information for the next hop in the routing table, accordingly, the domain router (e.g., R3) should generate and manage interface information of neighboring adjacent domain router (e.g., R1) (S140).

For example, in FIG. 3, if it is desired to move to Q:Q2:2 from Q:Q1:5, the next hop information for moving to Q:Q2 among the destination list of Q:Q1:5 may be recorded in the routing table of the domain router R3 as Q:Q1:1. On the other hand, as shown in FIG. 3, if Q:Q1:5 desires to move to Q:Q2:2, it can be seen that the domain router R3 should transmit a DSA message to the domain router R1. Thus, according to the routing table of the domain router R, the next hop information for moving to Q:Q2 from Q:Q1:5 should be converted and managed to indicate that it is interface information for moving to an adjacent domain router R1. The interface information may be outlet information for routing to an upper layer through the adjacent domain router.

Figure 6:
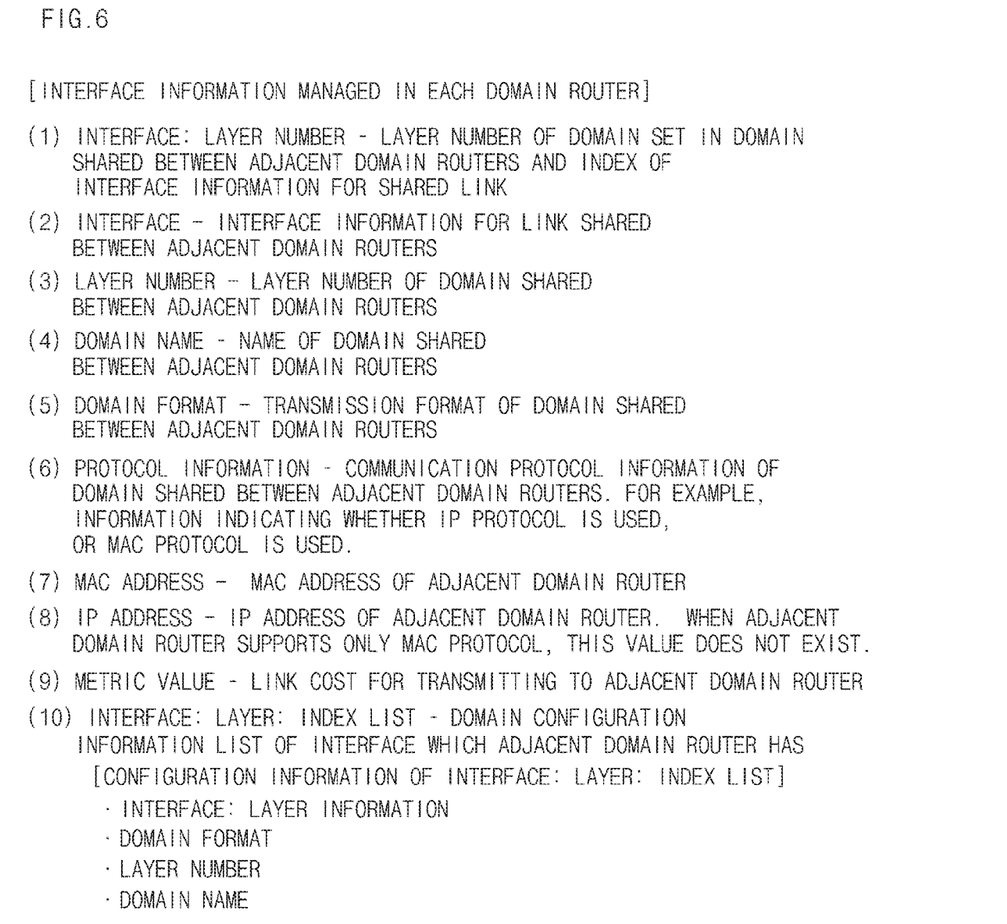
FIG. 6 is a diagram illustrating information included in interface information shared with an adjacent domain router in a domain router according to an embodiment of the present disclosure.
Figure 7:
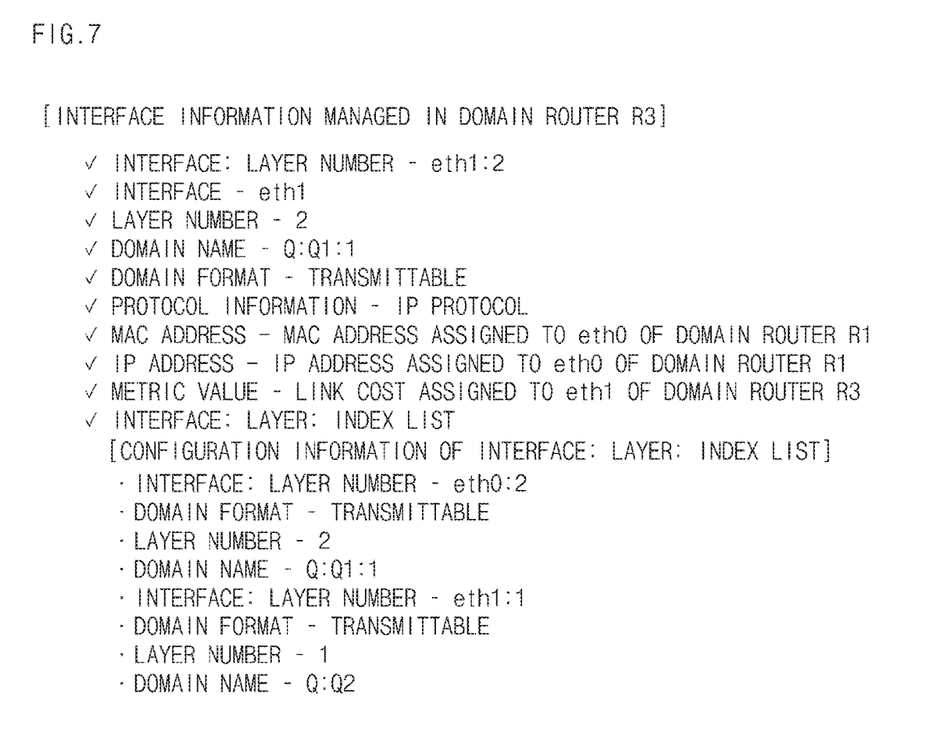
FIG. 7 is a diagram illustrating information included in interface information managed by the router R3 of FIG. 3.

The interface information is not able to be recognized by information of a DSA database maintained in a domain area. The DSA database may have information indicating only that the outlet domain of Q:Q1 is Q:Q1:1 and it is possible to move to Q:Q2 through Q:Q1:1. Therefore, interface information should be mutually shared between the adjacent domain routers (e.g., R1, R3) in the domain network. That is, the domain R3 and R1 may share information with each other to achieve a domain router neighboring relationship and may convert the next hop domain information into the interface information for the adjacent domain router. The interface information which should be shared between this adjacent domain routers (e.g., R1, R3), as shown in FIG. 6, may include information such as an interface index (eth0, eth1, etc.) for a share link (domain) information and corresponding domain layer number (interface: layer number), interface information (interface index) of share link, layer number/name/domain format/protocol information/for the share domain, MAC address/IP address of adjacent router, a transmission metric to adjacent router, a domain configuration information list (interface: layer index list) of each interface which an adjacent domain router has, and the like. For example, interface information may be configured and managed in the routing table as shown in FIG. 7 with respect to the adjacent domain router R1 collected in the domain router R3 in FIG. 3.

Thus, the domain router R3 may search whether the adjacent domain router that has Q:Q2 in interface: layer: index list exists in the domain routers among the domain router which achieved a neighboring relationship through Q:Q1:1, and convert and manage a Medium Access Control (MAC) address, an Internet Protocol (IP) address, or MAC and IP addresses, and an interface index, and the like as interface information in the routing table, and enable domains to refer.

As described above, the domain router according to the present disclosure, may generate a necessary routing table by reconfiguring a hierarchical domain-based network structure in order to take advantage of a hierarchical domain structure so that it is possible to solve the problem that the routing table size is increased exponentially according to the increase of the number of the domain router, and it is possible to shorten the number of a control message such as the DSA or the message delay spread time. In addition, each domain router may manage the destination domain list hierarchically, and generate and manage the next hop information, information of interface with adjacent router, and the like for moving to a destination domain in the routing table, and thus may search a domain corresponding to the next hop from among a current domain based on the routing table and search information of interface to a neighboring domain router for moving to a corresponding next hop, thereby accomplishing a routing efficiently.

The foregoing elements or functions, and the like for performing the above method for hierarchically managing routing information in a domain router according to an embodiment of the present disclosure may be implemented in hardware, software, or a combination thereof. Further, the foregoing elements or functions, and the like according to an embodiment of the present disclosure may be implemented as a code that can be readable by a computer or a processor in a recording medium that can be readable by a computer or a processor when the elements or functions are executed by one or more computers or processors. The processor-readable recording medium includes all kinds of recording devices storing data that can be read by a processor. Examples of the processor-readable recording medium includes ROM, RAM, CD-ROM, a magnetic tape, a floppy disk, an optical data storage device, and the like, and also includes those that are implemented in the form of a carrier wave such as data transmission through Internet. In addition, the processor-readable recording medium may store and execute a code which is distributed in computer systems connected through a network, and is readable by the processor in a distribution type.

Figure 8:
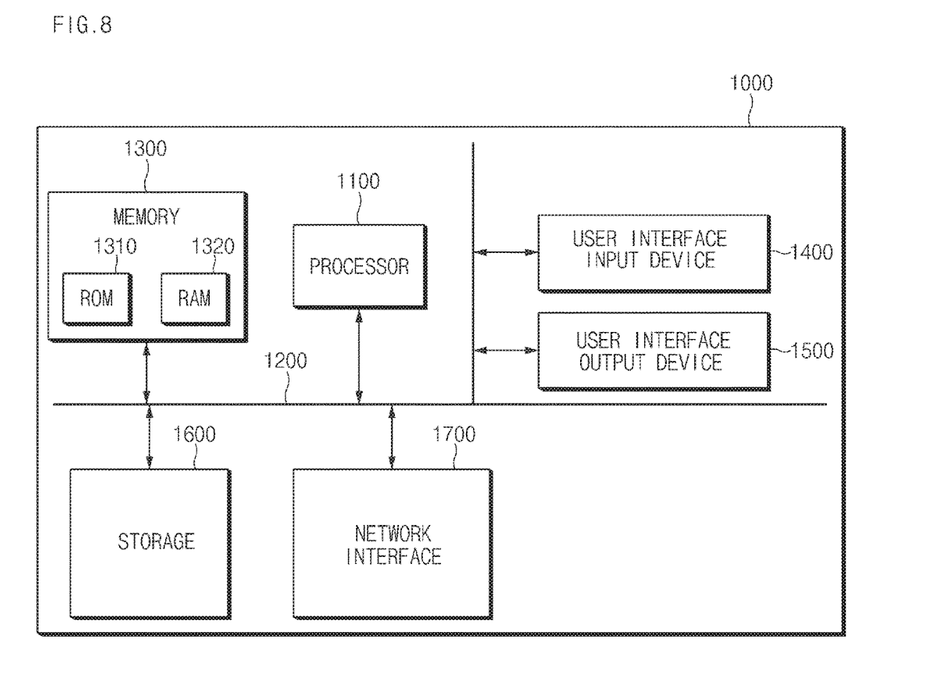
FIG. 8 is a diagram illustrating an example for realizing a function of a hierarchical management method of routing information in a domain router according to an embodiment of the present disclosure.

FIG. 8 is a diagram illustrating an example for realizing a function of a hierarchical management method of routing information in a domain router according to an embodiment of the present disclosure.

The foregoing elements or functions for a hierarchical management of routing information in a domain router according to an embodiment of the present disclosure may be implemented by a hardware, a software module, or a combination thereof, and may be implemented by a computing system 1000 of FIG. 8.

The computing system 1000 may include at least one processor 1100 which is connected via a bus 1200, memory 1300, an user interface input device 1400, an user interface output device 1500, a storage 1600, and a network interface 1700. The processor 1100 may be a semiconductor device for performing a processing for instructions stored in a central processing unit (CPU) or the memory 1300 and/or the storage 1600. The memory 1300 and the storage 1600 may include various types of volatile and nonvolatile storage media. For example, the memory 1300 may include a Read Only Memory (ROM) and Random Access Memory (RAM).

Thus, the steps of the method or the algorithm described in association with the embodiments disclosed herein may be directly implemented by a hardware, a software module, or a combination of the two executed by the processor 1100. The software module may reside in a storage medium (i.e., in the memory 1300 and/or the storage 1600) such as a RAM memory, a flash memory, a ROM memory, an EPROM memory, an EEPROM memory, a register, a hard disk, a removable disk, and CD-ROM. The exemplary storage medium may be coupled to the processor 1100, and the processor 1100 may read information from the storage medium and write information to the storage medium. Alternatively, the storage medium may be integrated in the processor 1100. The processor and the storage medium may reside in an application specific integrated circuit (ASIC). The ASIC may reside in a user terminal. Alternatively, the processor and the storage medium may reside in the user terminal as an individual component.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A method for hierarchically managing routing information in a domain router for routing domains on a network, the method comprising:
processing computer executable program code embodied in non-transitory computer readable storage media by a processor, the computer executable program code comprising:
program code that stores and manages a domain state advertisement (DSA) message received from a neighboring domain router in a storage unit in a certain database format, that generates at least one management target domain area according to the domain state advertisement message, and that generates management information including a spanning tree including routing topology information and a routing table for each of the management target domain area to maintain in the storage unit; and
program code that reconfigures the spanning tree according to a change of the database or a given cycle and that updates the routing table to store and manage in the storage unit,
wherein the domains in the network are configured in a hierarchical parent-child domain structure comprising an uppermost parent layer domain, a middle layer domain being a child to the uppermost parent layer domain, and a lower layer domain being a child to the middle layer domain, the middle layer domain comprising domain routers adjacent to the lower layer domains, and
wherein the domain routers generate and transmit the DSA messages to a domain router of a same layer having a same parent.

2. The method of claim 1, wherein a corresponding router which is a domain router of the same layer or an upper layer having the same parent as the neighboring domain router receives the domain state advertisement message transmitted by the neighboring domain router.

3. The method of claim 1, wherein the routing topology information comprises topology information between domains which have the same layer as its own layer and have the same parent domain information, and topology information on at least one upper domain having domain information identical with parent domain information.

4. The method of claim 1, wherein the routing table manages a list for information on connection between layers with respect to destination domains belonging to the same layer as a destination domain list of a source domain and destination domains of its upper layer.

5. The method of claim 4, wherein the routing table further manages next hop information for routing to the destination domains and outlet information of the domain router for routing to the upper layer.

6. The method of claim 5, wherein the routing table manages interface information on at least one adjacent domain router as the outlet information.

7. The method of claim 6, wherein the interface information comprises information on an interface index for a domain shared with the adjacent domain router, a layer number of a corresponding share domain, a name, domain format, protocol information of a corresponding share domain, a MAC address, IP address of the adjacent router, a transmission metric to the adjacent router, and a domain configuration information list of each interface which the adjacent domain router has.

8. The method of claim 1, wherein the domain state advertisement message comprises a domain identifier, layer information, a domain format, outlet information, metric, a number of adjacent domain, and a neighboring domain list, and the neighboring domain list comprises a domain identifier, layer information, a domain format, an outlet indicator, and a deletion indicator.

9. A domain router for hierarchically managing routing information for routing domains on a network, the domain router comprising:
   a storage unit; and
   a processor that processes computer executable program code embodied in non-transitory computer readable storage media, the computer executable program code comprising:
   management program code that stores and manages a domain state advertisement message received from a neighboring domain router in the storage unit in a certain database format, that generates at least one management target domain area according to the domain state advertisement (DSA) message, and that generates management information including a spanning tree including routing topology information and a routing table for each of the management target domain area to maintain in the storage unit,
   wherein the management program code reconfigures the spanning tree according to a change of the database or a given cycle and updates the routing table to store and manage in the storage unit,
   wherein the domains in the network are configured in a hierarchical parent-child domain structure comprising an uppermost parent layer domain, a middle layer domain being a child to the uppermost parent layer domain, and a lower layer domain being a child to the middle layer domain, the middle layer domain comprising domain routers adjacent to the lower layer domains, and
   wherein the domain router generates and transmits the DSA messages to an adjacent domain router of a same layer having a same parent.

10. The domain router of claim 9, wherein the management unit of a corresponding router which is a domain router of the same layer or an upper layer having the same parent as the neighboring domain router receives the domain state advertisement message transmitted by the neighboring domain router.

11. The domain router of claim 9, wherein the routing topology information comprises topology information between domains which have the same layer as its own layer and have the same parent domain information, and topology information on at least one upper domain having domain information identical with parent domain information.

12. The domain router of claim 9, wherein the routing table manages a list for information on connection between layers with respect to destination domains belonging to the same layer as a destination domain list of a source domain and destination domains of its upper layer.

13. The domain router of claim 12, wherein the routing table further manages next hop information for routing to the destination domains and outlet information of the domain router for routing to the upper layer.

14. The domain router of claim 13, wherein the routing table manages interface information on at least one adjacent domain router as the outlet information.

15. The domain router of claim 13, wherein the interface information comprises information on an interface index for a domain shared with the adjacent domain router, a layer number of a corresponding share domain, a name, domain format, protocol information of a corresponding share domain, a MAC address, IP address of the adjacent router, a transmission metric to the adjacent router, and a domain configuration information list of each interface which the adjacent domain router has.

16. The domain router of claim 9, wherein the domain state advertisement message comprises a domain identifier, layer information, a domain format, outlet information, metric, a number of adjacent domain, and a neighboring domain list, and the neighboring domain list comprises a domain identifier, layer information, a domain format, an outlet indicator, and a deletion indicator.

* * * * *